United States Patent Office 3,424,262
Patented Jan. 28, 1969

3,424,262
HYDRAULIC POWER STEERING MECHANISM FOR A ROAD VEHICLE
Karl Kunz, Heuchling, near Lauf, Germany, assignor to Karl Heinz Schmidt, Hersbruck, Germany
Filed July 24, 1967, Ser. No. 655,586
U.S. Cl. 180—79.2　　9 Claims
Int. Cl. B62d 5/00

ABSTRACT OF THE DISCLOSURE

In a hydraulic power steering mechanism for a road vehicle where failure of the hydraulic pressure from a motor driven pump is caused by stalling of the engine or malfunction of the pump, a second hydraulic pump is provided that is driven by a road engaging wheel of the vehicle, and means is provided to substitute the hydraulic pressure developed by the second hydraulic pump for that of the motor driven pump in case of failure of the motor driven pump, automatic means being provided to effect this substitution.

---

Figure 1:
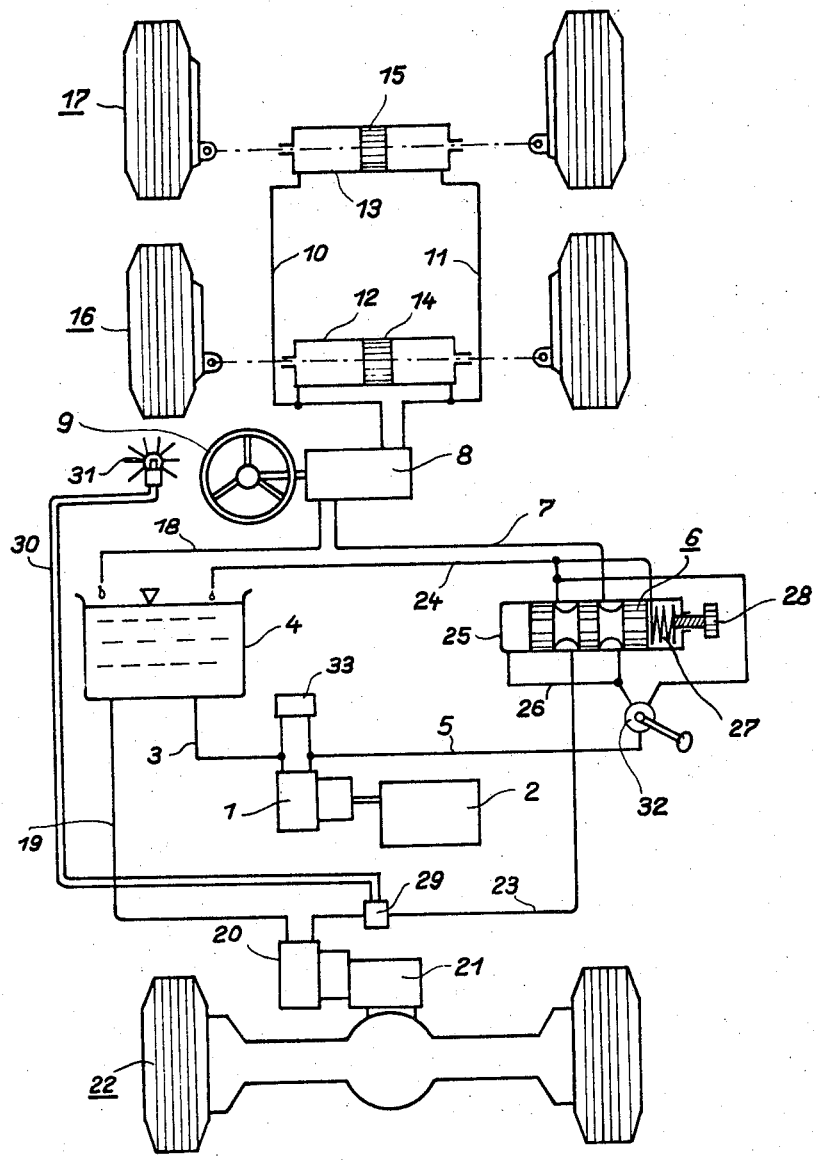

This invention relates to hydraulic steering aid mechanisms, or power steering, for motor vehicles.

In the case of heavy motor trucks which are generally provided with wheels of large diameter, a purely mechanical steering without power steering is not possible, especially when there are several steered axles provided.

To solve this problem, hydraulic servo-steering devices have been developed in which the steering forces are produced by means of work cylinders which are actuated by means of hydraulic fluid under pressure from a pressure pump driven by the vehicle motor via a control valve actuated from the steering wheel shaft.

It has been found, however, that such hydraulic servo-steering devices constitute a source of danger, since in case of a sudden failure, regardless of the reason for the failure, of hydraulic pressure from the pump actuating the working cylinders, the required steering forces can become so great that the driver may possibly no longer be able to steer the vehicle in an orderly manner, or at least to bring it to a stop at a suitable spot.

This disadvantage of the known servo-steering or power steering devices was to be overcome, according to an older proposal, in that the pressure pump which serves for feeding the working cylinder will in addition be utilized, via suitable valve arrangements, for loading up a pressure storage container into which the hydraulic pressure means are pressed against the pressure of a gas cushion. In case of failure of the pressure pump, the connection to the working cylinders is switched over from the pump supply side to an outlet conduit of the high pressure storage container, so that the pressure means delivery is maintained as an emergency measure for a short time which is at least adequate for parking the vehicle at a suitable spot.

A disadvantage of the hydraulic steering devices according to this older proposal consists in that the time in which an orderly steering of the vehicle is still possible after failure of the pressure pump is limited and depends on the holding capacity, and the working pressure, of the pressure storage container.

The present invention has the object of solving the problem, in the case of hydraulic power steering devices for motor vehicles of the basic construction under consideration, of having the necessary steering forces always safely available and thus to assure for a virtually unlimited time the steerability of the motor vehicle on failure of the pressure pump normally connected to the working cylinders.

For the solution of this problem, the present invention starts from a hydraulic steering mechanism for motor vehicles having a pressure pump driven by the motor of the vehicle, said pressure pump being connected via a control valve actuated from the steering wheel shaft with working cylinders acting upon the steerable vehicle wheels. Such a hydraulic servo-steering mechanism is characterized, according to the invention, by an auxiliary pump coupled with an axle shaft of the motor vehicle and operating continuously during travel of the vehicle, as well as by an automatic switching valve actuated by the discharge pressure of the motor driven main pump, said switching valve at a predetermined pressure of the main pump at its delivery side keeping the pump discharge connected with the control valve and thence to the servo-steering mechanism, and the auxiliary pump delivery side being directly connected with the fluid supply chamber. However, upon a drop in the main pump pressure occurring, the main pump delivery side is connected directly with the fluid supply chamber and the auxiliary pump delivery side is connected with the control valve of the servo-steering mechanism by movement of said switching valve.

According to a preferred embodiment of the invention, the switching valve is in the form of a multi-way piston slide which is normally biased by the pressure of the main pump in the direction to connect the main pump discharge with the control valve against the force of a spring means, the spring means tending to push said piston slide into a position in which the auxiliary pump discharge is connected with the control valve.

Figure 2:
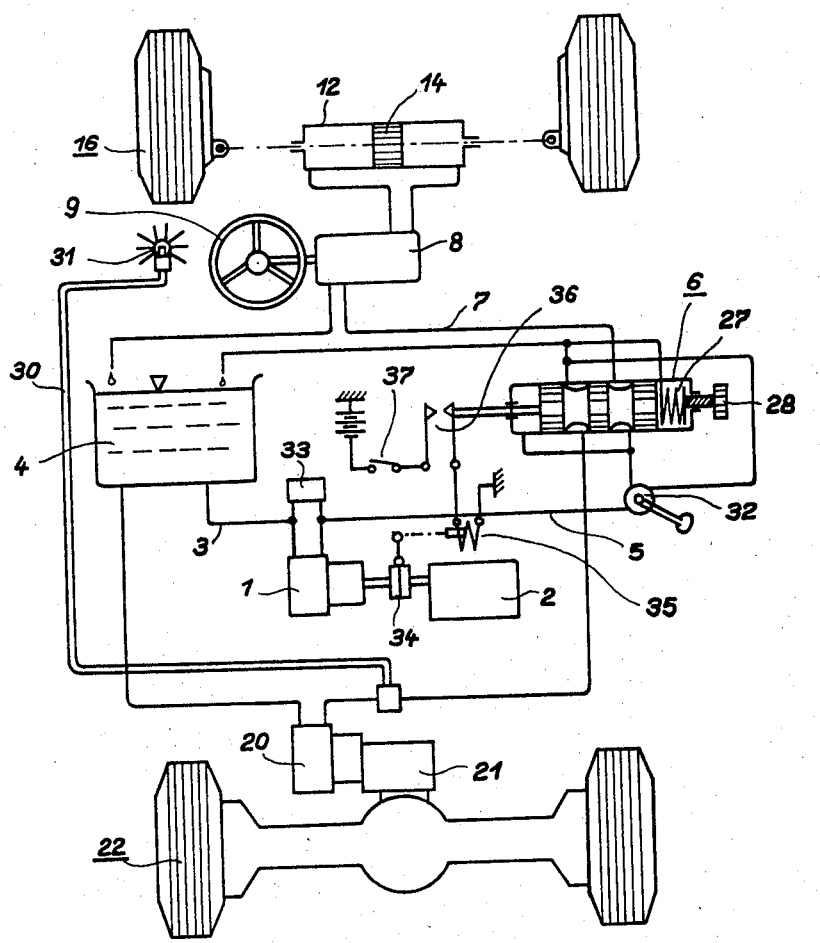
Figure 3:
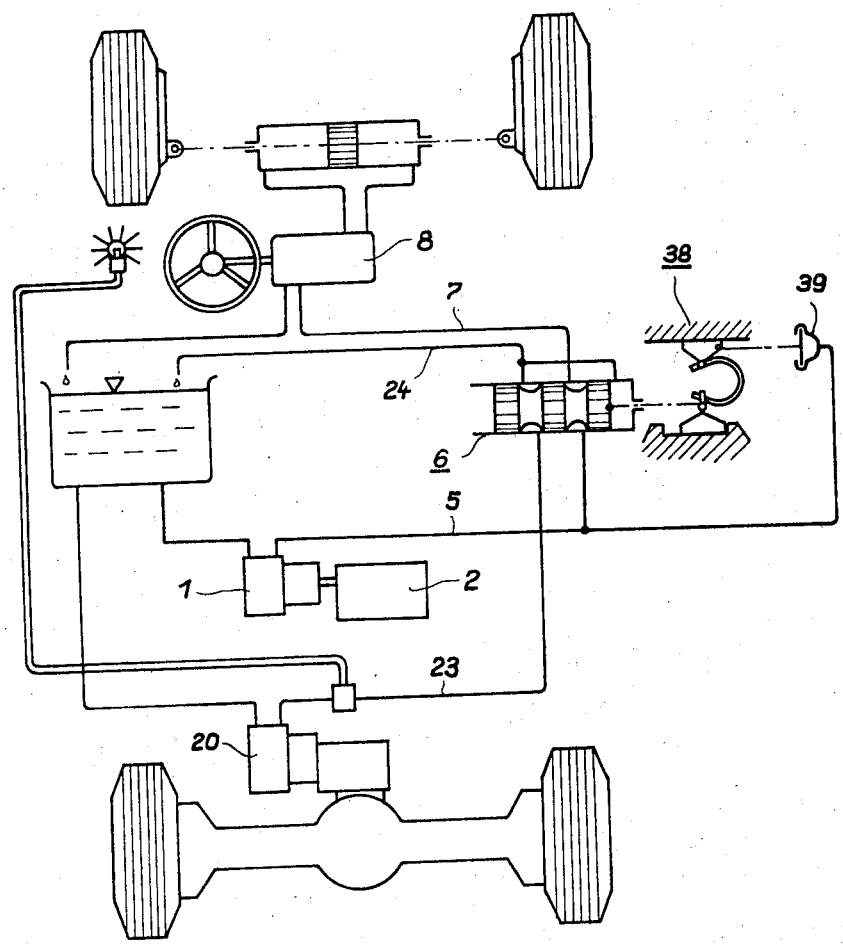

Special features and advantages of the invention will become clear from the following description of several special embodiments by way of example, with reference to the attached drawings, and in which:

FIGURE 1 is a diagrammatic showing of a hydraulic steering mechanism for motor vehicles with two steered axles, with the switching valve being actuated by the discharge pressure of the main pump, FIGURE 2 is a diagrammatic showing of a hydraulic steering mechanism similar to FIGURE 1, for motor vehicles with one steered axle and with a device for disconnecting a main pump which has become defective, and FIGURE 3 is a diagrammatic showing of a hydraulic steering mechanism having a switching valve actuated by means of a snap actuating mechanism triggered by the delivery pressure of the main pump.

Corresponding parts have been designated with the same reference numerals in the drawings.

In the steering mechanism according to the invention, shown in FIGURE 1, a main pump 1 is driven by motor 2 of the respective motor vehicle, either as indicated in the drawing via a shaft, or via a V-belt drive (not shown). The main pump 1 is connected via an intake duct 3 with a supply container 4 containing a hydraulic fluid and its delivery side is connected to a pipe or duct 5 which leads to an automatic switching valve 6. From said automatic switching valve 6 a pressure pipe or duct 7 leads to a control valve 8 which is coupled with the steering wheel column of the motor vehicle. The control valve is actuated by the turning of the vehicle steering wheel 9 by the driver to control delivery of fluid under pressure via ducts 10 and 11. Working pistons 14 and 15 are guided in the cylinders 12 and 13, said pistons being connected by way of a tie bar or the like with the wheels of the vehicle which are to be steered. The motor vehicle in this embodiment has two steerable axle units 16 and 17. A return conduit 18 leads from the control valve 8 back to the pressure supply chamber 4.

In addition to this main circuit, the hydraulic steering mechanism has an auxiliary circuit which is also fed from the pressure fluid supply chamber 4 via an intake duct 19. Said duct 19 leads to the suction side of an auxiliary pressure pump 20 which is coupled by a gearing 21 with a rear axle unit 22 of the motor vehicle. The gearing 21 translates the rotational speed of the rear axle shaft into a rotational speed suitable for operating the pressure pump 20.

From the delivery side of the auxiliary pressure pump 20 a pressure duct 23 leads to the switching valve 6. Finally a discharge conduit 24 leads from said switching valve to the hydraulic fluid supply chamber 4.

In the case of the present embodiment of the invention, the automatic switching valve is in the form of a multi-way piston slide valve which, on the one side, is actuated by the pressure effective on the delivery side of the main pump 1, said pressure being supplied to a cylinder chamber 25 of the multi-way piston slide valve 6 via a branch conduit 26 branching from the conduit 5. On the other side, the piston slide of the switching valve 6 is subject to the force effect of a spring 27 having a tension adjustable, for example, by means of an adjusting screw 28.

The annular grooves forming channels in the body and the connections to the valve housing of the multi-way valve 6, as well as the associated stops, are so selected in their dimensions that with a proper delivery pressure of the main pump 1, which is connected to the cylinder chamber 25 via the duct 5 and the branch duct 26, the duct 5 is connected with the duct 7 which leads to the control valve 8, while the pressure duct 23 which is connected with the delivery side of the auxiliary pump 20 is connected to the discharge duct 24. This switching position of the automatic switching valve 6 is clear in FIGURE 1 of the drawings.

On the delivery side of the auxiliary pressure pump 20 there is disposed, in the path of conduit 23, a fluid flow monitor 29 which is connected via signal conduits 30 with a signal lamp 31 situated within the range of vision of the driver so that the signal lamp 31 lights up upon interruption of the fluid flow.

Between the discharge connection of the main pressure pump 1 and the branching-off point of the branch duct 26 there is disposed, in the pressure duct 5, a three-way valve 32 by means of which the duct 5 can be manually disconnected from the automatic switching valve 6 and connected directly with the discharge duct 24 leading back to the fluid supply chamber 4.

As indicated in FIGURE 1 of the drawings, a volume governor or an over pressure relief valve 33 can also be inserted in between the inlet side and the discharge side of the main pressure pump.

The mode of operation of the hydraulic steering mechanism, as shown in FIGURE 1, will be briefly explained as follows:

After the motor 2 has been started, the pump 1 delivers hydraulic fluid under pressure from the fluid supply chamber 4 via the duct 3 to the duct 5, so that pressure builds up in the latter which is transmitted via the branch duct 26 to the cylinder chamber 25. The result is that the multi-way piston slide is biased by the fluid under pressure against the force of the spring 27 so it moves toward the right into the switching position shown in FIGURE 1. In this switching position of valve 6 the pressure pump 1 delivers fluid under pressure into the duct 7 so that, by means of the control valve 8, the hydraulic fluid proceeds into the working cylinders 12 and 13 as required. When the hydraulic fluid produces the desired steering forces on one face of cylinders 13 and 14 the hydraulic fluid displaced from the other end of cylinders 12 and 13 is conducted back to the supply chamber 4 via the duct 18. Thus, with the motor running, the driver upon actuation of the control valve 8 by steering wheel 9 can turn the wheels of the axle units 17 and 16 as desired.

If now the vehicle starts to move, the rear axle shaft of the axle unit 22 begins to rotate so the pump 20 is driven via the gearing 21, this pump takes suction from the supply chamber 4 via the duct 19 and delivers hydraulic fluid under pressure to the duct 23. In the switching position of the switching valve 6 which is shown in FIGURE 1, however, a direct connection is established between the ducts 23 and 24 so that the pressure fluid delivered by the auxiliary pump 20 flows back into the supply container 4 so long as the pictured position of the switching valve 6 is maintained.

If the operating pressure in the delivery duct 5 should decrease due to trouble in the main pressure pump 1, or due to a break in the duct circuit or stalling of engine 2, the spring 27 will move the multi-way piston slide 6 toward the left, in reference to the position shown in FIGURE 1, whereby duct 5 is disconnected from duct 7 leading to the control valve 8, and duct 5 will be connected to the discharge duct 24, so that the main pressure pump which has become defective is moved from the hydraulic steering circuit. Any flow in duct 5 will then be delivered without pressure to the supply chamber 4. At the same time the duct 23 which was previously connected with the discharge duct 24 is now blocked by a land on valve 6 to prevent flow to duct 24, and is connected with the pressure duct 7 so that the delivery of hydraulic fluid under pressure to the control valve 8 is now taken over by the auxiliary pressure pump 20 which operates, in any case, during continued travel of the vehicle.

It is pointed out that the specific construction of the automatic switching valve 6 as shown in the drawings is not of substantial significance to the invention, but that other valve designs with corresponding switching positions could be utilized for the same purpose.

The three-way valve 32 serves to check the operation of the automatic switching valve during travel of the vehicle, in that the pressure duct 5 may be disconnected from the switching valve 6 so that the switching operation described above can take place.

The three-way valve 32 has the further task of disconnecting the duct 5 from the switching valve 6 and connecting it to the supply chamber 4 and thereby to bring about a switching over of the valve 6 if, due to a malfunctioning of the main pressure pump, the pressure in the delivery duct 5, while still barely sufficient to maintain the switching position of the switching valve 6 shown in FIGURES 1 and 2, is no longer able to produce satisfactory steering forces.

The steering mechanism as shown in FIGURE 2 shows extensive similarity with the embodiment shown in FIGURE 1 as regards the arrangement of the main and auxiliary pressure circuits. Clearly, the steering mechanism according to FIGURE 2 can also be utilized for the steering of motor vehicles with two steerable axle units.

According to FIGURE 2, the main pressure pump 1 is connected with the motor of the motor vehicle not directly but via a clutch or coupling 34. This coupling can be disengaged with the aid of an actuating device 35, shown in the present case to be a solenoid, as soon as the switching valve 6, due to a pressure drop in the delivery duct 5, moves into a position in which the delivery duct 5 is disconnected from the duct 7 which leads to the control valve 8. This is achieved, according to the invention, by means of a switch 36 which is actuated by an element 6' mounted on the multi-way piston slide in the manner indicated in FIG. 2, as soon as the switching valve 6 changes its switching position. In series with the switch 36 there is also connected a normally closed switch 37 which is opened with the activation of the starter of the motor vehicle so that coupling 34 remains connected during the starting of the motor 2 of the vehicle, since the pressure pump 1 cannot, at the time of starting the vehicle motor, produce an adequate delivery pressure in the duct 5 which could bring about the position of the switching valve 6 shown in FIGURE 2 to cause the opening of the contacts 36.

It will be understood, therefore, that by means of the coupling arrangement 34, 35, 36 according to FIGURE 2, a defective main pressure pump 1, whose delivery has already been taken over by the auxiliary pressure pump 20, does not need to continue to be driven by the motor 2 of the vehicle and thereby possibly incur still greater damage.

The hydraulic steering mechanism according to the invention, as shown in FIGURE 3 of the drawings, differs from the two embodiments of the invention described previously in the actuating mechanism for the automatic switching valve 6. In this case, the latter does not have a cylinder chamber 25 and is also not under bias by a spring 27. Rather, the multi-way piston slide is connected with a snap actuating mechanism 38 which is shown in FIGURE 3 only symbolically and for the construction of which there are many possibilities known to the expert. The snap actuating mechanism 38 is coupled with a pressure capsule 39 which, on its part, is connected with the delivery duct 5. In case of a pressure drop in the delivery duct 5, the membrane of the pressure capsule 39 arches itself inward so that the snap actuating mechanism is tripped to the left, in the sense of a movement of the multi-way piston slide of the automatic switching valve 6, and the delivery duct 5 of the main pressure pump 1 is disconnected from the duct 7 which leads to the control valve 8 and is connected with the discharge duct 24, while the delivery duct 23 of the auxiliary pressure pump 20 is disconnected from the discharge duct 24 and is connected with the duct 7.

In the embodiment of the invention according to FIGURE 3, it is also possible to provide between the main pressure pump 1 and the motor 2 of the motor vehicle a disengagable coupling 34 as well as actuating devices and switching organs for actuating such a coupling in a similar manner as described in greater detail above in connection with FIGURE 2.

What is claimed is:

1. A hydarulic power steering mechanism for use on an automotive vehicle having steerable wheels and non-steerable wheels, a steering wheel for moving the steerable wheels to steer the vehicle, and a motor; hydraulic double acting, double ended servo piston means connected to said steerable wheels, a servo control valve operated by said steering wheel connected by hydraulic ducts to each end of said piston means, a fluid reservoir, a first return duct connected from said control valve to said fluid reservoir, a first hydraulic pressure pump having a suction and a discharge driven by said motro, a duct connecting said first pump suction to said fluid reservoir, a second hydraulic pressure pump having a suction and a discharge driven by said non-steerable wheels, a duct connecting said second pump suction to said fluid reservoir, a switching valve, a pressure duct from said switching valve to said control valve, a second return duct from said switching valve to said fluid reservoir, a duct connecting said discharge of said first pump to said switching valve, a duct connecting said discharge of said second pump to said switching valve, said switching valve including a housing, a movable valve body and passages in said housing and body normally connecting said duct from said first pump discharge via said switching valve to said control valve, and simultaneously connecting said duct from said second pump discharge via said switching valve to said second return duct, and means to move said valve body of said switching valve to connect said duct from said second pump discharge to said pressure duct leading to said control valve via said switching valve, and simultaneously connect said duct from said first pump discharge via said switching valve to said second return duct.

2. The power steering mechanism of claim 1 in which said switching valve includes a biasing means to constantly bias said valve to connect said second hydraulic pressure pump discharge to said control valve, and fluid pressure means is provided connected to said first pump discharge to move said valve against said biasing means to connect said first pump discharge to said control valve.

3. The power steering mechanism of claim 2 in which a disengageable clutch means connects said first hydraulic pressure pump to said motor, means is provided for disengaging said clutch, said switching valve being provided with a means to activate said means to disengage said clutch.

4. The power steering mechanism as claimed in claim 3 in which the means for disengaging said clutch includes a solenoid and an electric energy source, first switch means, said first switch means being coupled to said switching valve to be held open when said first pump is providing pressure to said steering mechanism, and second normally closed switch means being connected in series with said first switch means whereby during starting of said motor of said vehicle said solenoid is not energized, said first switch being closed when said switching valve is biased to connect said second pump discharge to said control valve.

5. The power steering mechanism of claim 1 in which a bypass valve is provided in said duct connecting said first hydraulic pressure pump to said switching valve, and a duct is provided connecting said bypass valve to said fluid reservoir.

6. The power steering mechanism of claim 1 in which a snap device is provided to position said switching valve, and hydraulic fluid pressure means is connected to said snap device whereby said discharge from said first pump is connected to said control valve when pressure is developed at said first pump discharge, and said discharge at said second pump is connected to said control valve when pressure at the discharge of said first pump fails.

7. The power steering mechanism of claim 1 in which a fluid flow monitor is connected in series with the discharge of said second fluid pressure pump and an electric signal lamp is so connected that said signal lamp is energized by said flow monitor when the fluid supply from said second fluid pressure pump is interrupted.

8. The hydraulic power steering mechanism of claim 1 in which said switching valve comprises a cylindrical housing, a slidable multi-passage valve piston in said housing, a spring biasing said valve piston toward the position to connect said second pump discharge to said control valve, hydraulic biasing means opposed to said spring biasing means to urge said valve piston toward the position to connect said first pump discharge to said control valve, whereby said discharge of said first pump is connected to said control valve when said first pump is delivering hydraulic fluid to said hydraulic biasing means at a pressure to overcome said spring biasing means.

9. The hydraulic power steering mechanism of claim 7 including also means to adjust the spring biasing means to increase or decrease the bias thereof.

References Cited

UNITED STATES PATENTS

| | | | |
|---|---|---|---|
| 2,918,135 | 12/1959 | Wittren | 180—79.2 |
| 3,065,810 | 11/1962 | Chambers et al. | 180—6.7 |
| 3,153,462 | 10/1964 | Peller | 180—79.2 |
| 3,347,041 | 10/1967 | Bahniuk et al. | 180—79.2 |

BENJAMIN HERSH, *Primary Examiner.*

L. DANIEL MORRIS, JR., *Assistant Examiner.*